(12) United States Patent
Fermelis et al.

(10) Patent No.: US 11,677,164 B2
(45) Date of Patent: Jun. 13, 2023

(54) HYBRID ANTENNA DISTRIBUTION UNIT

(71) Applicant: RAYCAP IP ASSETS LTD, Nicosia (CY)

(72) Inventors: Elias Fermelis, Koropi (GR); Charis Coletti, Nea Erythrea (GR); Kostas Bakatsias, Gerakas (GR)

(73) Assignee: Raycap IP Assets Ltd, Nicosia (CY)

( * ) Notice: Subject to any disclaimer, the term of this patent is extended or adjusted under 35 U.S.C. 154(b) by 219 days.

(21) Appl. No.: 17/029,877

(22) Filed: Sep. 23, 2020

(65) Prior Publication Data

US 2021/0091481 A1    Mar. 25, 2021

Related U.S. Application Data

(60) Provisional application No. 62/905,898, filed on Sep. 25, 2019.

(51) Int. Cl.
| | |
|---|---|
| *H01Q 21/30* | (2006.01) |
| *H01Q 1/24* | (2006.01) |
| *H01Q 21/00* | (2006.01) |
| *G02B 6/44* | (2006.01) |

(52) U.S. Cl.
CPC .......... *H01Q 21/30* (2013.01); *G02B 6/4472* (2013.01); *H01Q 1/246* (2013.01); *H01Q 21/0006* (2013.01); *G02B 6/4448* (2013.01)

(58) Field of Classification Search
None
See application file for complete search history.

(56) References Cited

U.S. PATENT DOCUMENTS

| | | |
|---|---|---|
| 2,899,160 A | 8/1959 | Sher |
| 3,066,181 A | 11/1962 | Archibald |
| 3,165,372 A | 1/1965 | Jacobs |
| 3,247,479 A | 4/1966 | Knipping |
| 3,659,189 A | 4/1972 | Kiviranna |
| 3,659,277 A | 4/1972 | Brown |
| 3,876,076 A | 4/1975 | Hazelhurst |
| 3,936,133 A | 2/1976 | Splitt |
| 3,976,351 A | 8/1976 | Hopfe |
| 4,030,061 A | 6/1977 | Gaskell |
| 4,236,190 A | 11/1980 | Hollingsead |

(Continued)

FOREIGN PATENT DOCUMENTS

| | | |
|---|---|---|
| CA | 3046255 A1 | 6/2018 |
| DE | 202005021740 U1 | 8/2009 |

(Continued)

OTHER PUBLICATIONS

Extended European Search Report for EP Application No. 20198469.7 dated Feb. 12, 2021; 7 pages.

(Continued)

*Primary Examiner* — Jerry Rahill
(74) *Attorney, Agent, or Firm* — Schwabe, Williamson & Wyatt, PC

(57) ABSTRACT

Some embodiments of the present disclosure are directed to a hybrid distribution unit that can distribute both power and data connections from a power and fiber cables (or from a hybrid cable containing both power and fiber) within a compact enclosure that helps reduce the overall footprint of the hybrid distribution unit mounted on a cellular tower. Other embodiments may be described or claimed.

18 Claims, 13 Drawing Sheets

(56) References Cited

U.S. PATENT DOCUMENTS

| | | |
|---|---|---|
| 4,918,565 A | 4/1990 | King |
| 4,976,508 A | 12/1990 | Okura |
| 5,030,128 A | 7/1991 | Herron |
| 5,311,397 A | 5/1994 | Harshberger |
| D361,314 S | 8/1995 | Ryan |
| D362,232 S | 9/1995 | Ryan |
| 5,473,244 A | 12/1995 | Libove |
| 5,473,718 A | 12/1995 | Sommer |
| 5,491,766 A | 2/1996 | Huynh |
| 5,530,215 A | 6/1996 | Couvreur |
| 5,533,117 A | 7/1996 | Kim |
| 5,555,153 A | 9/1996 | Frederiksen |
| 5,602,532 A | 2/1997 | Ryan |
| 5,627,721 A | 5/1997 | Figueiredo |
| 5,651,698 A | 7/1997 | Locati |
| 5,701,227 A | 12/1997 | Ryan |
| 5,717,685 A | 2/1998 | Abraham |
| 5,790,360 A | 8/1998 | Ryan |
| 5,805,757 A | 9/1998 | Bloom |
| 5,903,693 A | 5/1999 | Brown |
| 5,914,845 A | 6/1999 | Chase |
| 5,953,193 A | 9/1999 | Ryan |
| 5,966,282 A | 10/1999 | Ryan |
| 5,969,932 A | 10/1999 | Ryan |
| 6,018,452 A | 1/2000 | Meyerhoefer |
| 6,031,706 A | 2/2000 | Nabell |
| 6,037,544 A | 3/2000 | Lee |
| 6,038,119 A | 3/2000 | Atkins |
| 6,074,247 A | 6/2000 | Hall |
| 6,114,632 A | 9/2000 | Planas, Sr. |
| 6,122,156 A | 9/2000 | Nabell |
| 6,125,048 A | 9/2000 | Loughran |
| 6,314,229 B1 * | 11/2001 | Sasaki .................. H02G 15/013 385/135 |
| 6,389,214 B1 | 5/2002 | Smith |
| 6,418,262 B1 | 7/2002 | Puetz |
| 6,430,020 B1 | 8/2002 | Atkins |
| 6,501,634 B1 | 12/2002 | Hubbell |
| 6,535,369 B1 | 3/2003 | Redding |
| 6,556,402 B2 | 4/2003 | Kizis |
| 6,608,401 B1 | 8/2003 | Walter |
| 6,623,315 B1 | 9/2003 | Roderick |
| 6,636,409 B2 | 10/2003 | Kladar |
| 6,640,111 B1 | 10/2003 | Shapira |
| 6,654,223 B1 | 11/2003 | Bippus |
| 6,715,619 B2 | 4/2004 | Kim |
| 6,719,615 B1 | 4/2004 | Molnar |
| 6,729,902 B2 | 5/2004 | Martich |
| 6,738,555 B1 | 5/2004 | Cooke |
| 6,748,155 B2 | 6/2004 | Kim |
| 6,763,171 B2 | 7/2004 | D'Inca |
| 6,771,861 B2 | 8/2004 | Wagner |
| 6,792,190 B2 | 9/2004 | Xin |
| 6,804,447 B2 | 10/2004 | Smith |
| 6,809,258 B1 | 10/2004 | Dang |
| 6,813,510 B1 | 11/2004 | Kunzinger |
| 6,851,966 B1 | 2/2005 | Tomasino |
| 6,876,533 B1 | 4/2005 | Ryan |
| 6,937,807 B2 | 8/2005 | Franklin |
| 7,008,256 B2 | 3/2006 | Poiraud |
| 7,035,073 B2 | 4/2006 | Bennett |
| 7,228,047 B1 | 6/2007 | Szilagyi |
| 7,218,828 B2 | 8/2007 | Feustel |
| 7,302,149 B2 | 11/2007 | Swam |
| 7,327,926 B2 | 2/2008 | Barth |
| 7,353,407 B2 | 4/2008 | Diab |
| 7,355,416 B1 | 4/2008 | Darshan |
| 7,376,322 B2 | 5/2008 | Zimmel |
| 7,397,673 B1 | 7/2008 | Wilson |
| 7,417,443 B2 | 8/2008 | Admon |
| 7,433,169 B2 | 10/2008 | Kamel |
| 7,451,329 B2 | 11/2008 | Schindler |
| 7,460,381 B2 | 12/2008 | Lanni |
| 7,508,687 B2 | 3/2009 | Manolescu |
| 7,526,174 B2 | 4/2009 | Leon |
| 7,664,363 B1 | 2/2010 | Mowery, Sr. |
| 7,683,625 B2 | 3/2010 | Milne |
| 7,714,592 B2 | 5/2010 | Radtke |
| 7,739,522 B2 | 6/2010 | Festo |
| 7,768,794 B1 | 8/2010 | Wilson |
| RE41,655 E | 9/2010 | Woodhead |
| 7,834,612 B2 | 11/2010 | Sohnis |
| 7,873,252 B2 | 1/2011 | Smrha |
| 7,894,782 B2 | 2/2011 | Rofougaran |
| 7,946,863 B2 | 5/2011 | Loch |
| 7,949,315 B2 | 5/2011 | Rofougaran |
| 7,972,067 B2 | 7/2011 | Haley |
| 8,021,189 B2 | 9/2011 | Zayas |
| 8,111,966 B2 | 2/2012 | Holmberg |
| 8,121,457 B2 | 2/2012 | Zimmel |
| 8,180,192 B2 | 5/2012 | Zimmel |
| 8,279,067 B2 | 10/2012 | Berger |
| 8,314,583 B2 | 11/2012 | Yohanan |
| 8,401,497 B2 | 3/2013 | Rofougaran |
| 8,401,501 B2 | 3/2013 | Rofougaran |
| 8,412,385 B2 | 4/2013 | Brumett, Jr. |
| 8,457,461 B2 | 6/2013 | Ott |
| 8,467,655 B2 | 6/2013 | German |
| 8,490,799 B2 | 7/2013 | Knight |
| 8,521,100 B2 | 8/2013 | Rofougaran |
| 8,620,549 B2 | 8/2013 | Rofougaran |
| 8,526,200 B2 | 9/2013 | Miller |
| 8,526,893 B2 | 9/2013 | Rofougaran |
| 8,547,164 B2 | 10/2013 | Flores |
| 8,552,749 B2 | 10/2013 | Heath |
| 8,566,627 B2 | 10/2013 | Halepete |
| 8,576,873 B2 | 11/2013 | Diab |
| 8,577,359 B2 | 11/2013 | Wesby |
| 8,588,606 B2 | 11/2013 | Watte |
| 8,383,521 B2 | 12/2013 | Nishimura et al. |
| 8,600,318 B2 | 12/2013 | Rofougaran |
| 8,730,639 B1 | 5/2014 | Wilson |
| 8,754,622 B2 | 6/2014 | Dobkin |
| 8,779,786 B2 | 7/2014 | Maniktala |
| 8,780,519 B2 | 7/2014 | Miller |
| 8,810,990 B1 | 8/2014 | Miller |
| 8,831,395 B2 | 9/2014 | Sievers |
| 8,839,594 B2 | 9/2014 | Smith |
| 8,873,926 B2 | 10/2014 | Beamon |
| 8,938,143 B2 | 1/2015 | Do |
| 8,989,548 B2 | 3/2015 | Kopf |
| 8,995,106 B2 | 3/2015 | Miller |
| 9,049,500 B2 | 6/2015 | Conner |
| 9,057,862 B2 | 6/2015 | Strasser |
| 9,099,860 B2 | 8/2015 | Martinez |
| 9,140,872 B2 | 9/2015 | Sedor |
| 9,179,500 B2 | 11/2015 | Yu |
| 9,207,735 B2 | 12/2015 | Khaitan |
| 9,281,866 B2 | 3/2016 | Smentek |
| 9,448,576 B2 | 9/2016 | Chamberlain |
| 9,575,277 B2 | 2/2017 | Bakatsias |
| 9,634,844 B2 | 4/2017 | Paul |
| 9,640,986 B2 | 5/2017 | Politis |
| 9,673,904 B2 | 6/2017 | Palanisamy |
| 10,025,335 B2 | 7/2018 | Chamberlain |
| 10,027,108 B2 | 7/2018 | Peach |
| 10,257,056 B2 | 4/2019 | Hazani |
| 10,429,604 B2 | 10/2019 | Bakatsias |
| 10,782,720 B2 | 9/2020 | Guerin |
| 2001/0053971 A1 | 12/2001 | Demetrescu |
| 2002/0048133 A1 | 4/2002 | Jakwani |
| 2002/0055306 A1 | 5/2002 | Jenks |
| 2002/0150372 A1 | 10/2002 | Schray |
| 2002/0196593 A1 | 12/2002 | Kizis |
| 2003/0027521 A1 | 2/2003 | Yip |
| 2003/0085621 A1 | 5/2003 | Potega |
| 2003/0113086 A1 | 6/2003 | Jun |
| 2003/0148668 A1 | 8/2003 | Lias |
| 2004/0119386 A1 | 6/2004 | Guidez |
| 2004/0198451 A1 | 10/2004 | Varghese |
| 2004/0233605 A1 * | 11/2004 | Dabrowski ............ H04M 3/18 361/118 |
| 2004/0246693 A1 | 12/2004 | Lloyd |
| 2005/0036262 A1 | 2/2005 | Siebenthall |

(56) References Cited

U.S. PATENT DOCUMENTS

| | | |
|---|---|---|
| 2005/0042920 A1 | 2/2005 | Poiraud |
| 2005/0094359 A1 | 5/2005 | Lee |
| 2005/0157461 A1 | 7/2005 | Cauthron |
| 2005/0220021 A1 | 10/2005 | Sosnowski |
| 2005/0231872 A1 | 10/2005 | Schimanski |
| 2006/0139836 A1 | 6/2006 | Anthony |
| 2006/0153362 A1 | 7/2006 | Bloodworth |
| 2007/0024372 A1 | 2/2007 | Hagen |
| 2007/0093204 A1 | 4/2007 | Kincade |
| 2007/0163801 A1 | 7/2007 | Coffey |
| 2007/0217101 A1 | 9/2007 | Carter |
| 2008/0037188 A1 | 2/2008 | Wilson |
| 2008/0055822 A1 | 3/2008 | Rearick |
| 2008/0106881 A1 | 5/2008 | Tari |
| 2008/0117555 A1 | 5/2008 | Wilson |
| 2008/0139045 A1 | 6/2008 | Ho |
| 2008/0186667 A1 | 8/2008 | Verdelli |
| 2008/0247112 A1 | 10/2008 | Benedetto |
| 2008/0272654 A1 | 11/2008 | Lontka |
| 2008/0278889 A1 | 11/2008 | Briggs |
| 2008/0298762 A1 | 12/2008 | Hawley |
| 2008/0310060 A1 | 12/2008 | Metral |
| 2009/0103218 A1 | 4/2009 | Ryan |
| 2009/0103881 A1 | 4/2009 | Gonzalez |
| 2009/0226143 A1 | 9/2009 | Beck |
| 2009/0238531 A1 | 9/2009 | Holmberg |
| 2009/0257727 A1 | 10/2009 | Laurisch |
| 2010/0034507 A1 | 2/2010 | Sielaff |
| 2010/0054676 A1 | 3/2010 | Cooke |
| 2010/0181840 A1 | 7/2010 | Coulson |
| 2010/0259871 A1 | 10/2010 | Ewing |
| 2011/0101937 A1 | 5/2011 | Dobkin |
| 2011/0135316 A1 | 6/2011 | Fankhauser |
| 2011/0237299 A1 | 9/2011 | Boss |
| 2011/0262146 A1* | 10/2011 | Khemakhem ........ G02B 6/4457 398/117 |
| 2012/0043432 A1 | 2/2012 | Heitmeyer |
| 2012/0051710 A1 | 3/2012 | Zeng |
| 2012/0069882 A1 | 3/2012 | Nino |
| 2012/0092835 A1* | 4/2012 | Miller ................. H01R 4/5008 439/864 |
| 2012/0114295 A1 | 5/2012 | Guzzo |
| 2012/0200978 A1 | 8/2012 | Miller |
| 2012/0200979 A1 | 8/2012 | Miller |
| 2012/0230636 A1 | 9/2012 | Blockley |
| 2012/0269509 A1 | 10/2012 | Hultermans |
| 2012/0317426 A1 | 12/2012 | Hunter, Jr. |
| 2012/0319485 A1 | 12/2012 | Ewing |
| 2013/0003677 A1 | 1/2013 | Yu |
| 2013/0039629 A1 | 2/2013 | Krampotich |
| 2013/0051440 A1 | 2/2013 | Rofougaran |
| 2013/0084050 A1 | 4/2013 | Vastmans |
| 2013/0108227 A1* | 5/2013 | Conner ................ G02B 6/4471 385/101 |
| 2013/0114930 A1 | 5/2013 | Smith |
| 2013/0146355 A1 | 6/2013 | Strasser |
| 2013/0170801 A1 | 7/2013 | Do |
| 2013/0215804 A1 | 8/2013 | Lu |
| 2013/0294735 A1 | 11/2013 | Burris |
| 2013/0308915 A1 | 11/2013 | Buff |
| 2013/0340361 A1 | 12/2013 | Rogers |
| 2014/0044400 A1* | 2/2014 | Anguiano ............ G02B 6/4452 29/428 |
| 2014/0168842 A1 | 6/2014 | Martinez |
| 2014/0219622 A1 | 8/2014 | Coan |
| 2014/0248028 A1 | 9/2014 | Campbell |
| 2014/0314388 A1 | 10/2014 | Alberts |
| 2014/0376909 A1 | 12/2014 | Frisken |
| 2015/0006095 A1 | 1/2015 | Voisine |
| 2015/0109710 A1* | 4/2015 | Politis ................. H02G 15/113 361/119 |
| 2015/0155669 A1 | 6/2015 | Chamberlain |
| 2015/0155706 A1 | 6/2015 | Miller |
| 2015/0168974 A1 | 6/2015 | Mascarenhas |
| 2015/0234399 A1 | 8/2015 | Chamberlain |
| 2015/0234405 A1 | 8/2015 | Chamberlain |
| 2015/0334476 A1 | 11/2015 | Smith |
| 2016/0043806 A1 | 2/2016 | Maricevic |
| 2016/0139355 A1 | 5/2016 | Petersen |
| 2016/0231524 A1 | 8/2016 | Womack |
| 2016/0276817 A1* | 9/2016 | Wang ................... G02B 6/4471 |
| 2016/0342168 A1 | 11/2016 | Chamberlain |
| 2017/0123175 A1 | 5/2017 | Van Baelen |
| 2018/0090895 A1* | 3/2018 | Wang ....................... G02B 6/46 |
| 2018/0157200 A1 | 6/2018 | Miller |
| 2018/0159319 A1 | 6/2018 | Miller |
| 2018/0173263 A1 | 6/2018 | Chamberlain |
| 2018/0213091 A1 | 7/2018 | Kostakis |
| 2018/0231731 A1 | 8/2018 | Bakatsias |
| 2018/0254629 A1 | 9/2018 | Gattis |
| 2019/0258280 A1 | 8/2019 | Chamberlain |
| 2020/0076187 A1 | 3/2020 | Warner |
| 2021/0091481 A1* | 3/2021 | Fermelis ................ H01Q 1/246 |

FOREIGN PATENT DOCUMENTS

| | | |
|---|---|---|
| DE | 698717 B1 | 10/2009 |
| DE | 102012008923 B4 | 9/2014 |
| DE | 102011111288 B4 | 3/2018 |
| DE | 102011111399 B4 | 5/2018 |
| EP | 0095539 A1 | 12/1983 |
| EP | 0660287 A1 | 6/1995 |
| EP | 0942303 A1 | 9/1999 |
| EP | 1855365 A1 | 11/2007 |
| EP | 2005854158 | 11/2007 |
| EP | 2469661 A1 | 6/2012 |
| EP | 2536035 A1 | 12/2012 |
| GB | 0637657 A | 5/1950 |
| GB | 2421641 A | 6/2006 |
| GB | 2452780 A | 3/2009 |
| JP | S6250711 A1 | 3/1987 |
| JP | 2005 317472 A | 11/2005 |
| KR | 10-2010-0048227 A | 5/2010 |
| KR | 10-2010-0069332 A | 6/2010 |
| WO | 2006/076120 A1 | 7/2006 |
| WO | 2008/059212 A1 | 5/2008 |
| WO | 2008/135774 A1 | 11/2008 |
| WO | 2010/024847 A2 | 3/2010 |
| WO | 2012/038104 A1 | 3/2012 |
| WO | 2012/108929 A1 | 8/2012 |
| WO | 2012/108930 A1 | 8/2012 |
| WO | 2013/055591 A2 | 4/2013 |
| WO | 2013/165657 A1 | 11/2013 |
| WO | 2014/009255 A1 | 1/2014 |
| WO | 2014/118227 A1 | 8/2014 |
| WO | 2014/134154 A1 | 9/2014 |
| WO | 2018/136812 A1 | 7/2018 |

OTHER PUBLICATIONS

ALVARION BreezeMAX Extreme-System Manual (Preliminary) Jun. 2009; 206 pages.

AVITEC CSHP902 Repeater-User, Operation and Maintenance Manual 2001; 55 pages.

Davis, "Controller IC Eliminates Remote Sense Lines for Long Cable Runs" Power Electronics Technology May 2010; pp. 26-28.

Grcev et al., "Lightning Current Distribution to Ground at a Power Line Tower Carrying a Radion Base Station" IEEE Transactions on Electromagnetic Compatibility, vol. 47, No. 1, Feb. 2005; 11 pages.

HAMEG Instruments "Programmable Power Supply HM7044" May 2001; 20 pages.

Littelfuse, Application Note: Distributed Base Stations; Oct. 2012; 8 pages.

Noori, et al., "The RF Power Behind Design Innovation" Microwave Design White Paper; May 2007; 8 pages.

Noritake et al., "Evaluation Results of Power Supply to ICT Equipment Using HVDC Distribution System" Intelec, Jun. 10, 2010, pp. 1-8.

Patil et al., "Base Transceiver Station (BTS) Safety and Fault Management" International Journal of Innovative Technology and

(56) References Cited

OTHER PUBLICATIONS

Exploring Engineering (IJITEE); ISSN: 2278-3075, vol. 3, Issue-7; Dec. 2013; pp. 48-52.
Rahman, "Overview of energy saving aspects in 2G and 3G Mobile Communication Networks" Nov. 2009; 65 pages.
Williams et al., "2-Wire Virtual Remote Sensing for Voltage Regulators" Application Note 126; Oct. 2010; 22 pages.
CPRI Link Mobile Field Testing; AES (Advanced Embedded Solutions), aes-eu.com; Jun. 14, 2014; retrieved from the Internet Jun. 8, 2017 at <http://aes-eu.com/mobile-field-testing.php>; 4 pages.
Fis, the Solutionists, "High Density C-ran CPRI Interface Panel" Product Catalog, Rev. A; May 2015; Oriskany, New York; 2 pages. [Third Party Submission].
Fis, the Solutionists, CPRI Interface Panel Drawer with Integrated Cable Management; Sep. 27, 2015; ubeity.squarespace.com; Rev. A 3-2; 2 pages.
GE Product Data Sheet, CP2000DC54-PE Compact Power Line DC/DC Converter, Aug. 20, 2013, www.ge.com/powerelectronics; 15 pages.
International Preliminary Report on Patentablity and Written Opinion of the International Searching Authority for PCT/US2011/064704; Dated Aug. 22, 2013; 8 pages.
International Preliminary Report on Patentablity and Written Opinion of the International Searching Authority for PCT/US2011/064717 dated Aug. 22, 2013; 8 pages.
Keithley Product Sheet, Single-Channel Programmable DC Power Supplies, Series 2200, undated; www.keithly.com; 4 pages.
Müller, Ulrich, Deploying and Managing New Cell Sites with FRR; Apr. 4, 2015; Telcom Infra Event; <http://telecominfraonline.nl/deploying-managing-new-cell-sites/>; 21 pages.
Partial European Search Report for EP Application No. 18742120.1 dated Sep. 4, 2020; 23 pages.
Williams, et al. "2-Wire Virtual Remote Sensing for Voltage Regulators—Clairvoyance Marries Remote Sensing" Linear Technology Brochure, Application Note 126, Oct. 2010; www.linear.com; pp. AN126-1-AN126-22.
"Relay" from Wikipedia. Downloaded Oct. 30, 2009.
International Search Report and Written Opinion for PCT/US2011/064704; dated May 16, 2012; 12 pages.
International Search Report and Written Opinion for PCT/US2011/064717 dated May 16, 2012; 13 pages.
International Search Report and Written Opinion for PCT/US2015/013740 dated Apr. 28, 2015; 17 pages.
International Search Report and Written Opinion for PCT/US2016/022575 dated Aug. 17, 2016; 14 pages.
International Search Report and Written Opinion for PCT/US2018/014553 dated Apr. 6, 2018; 11 pages.

* cited by examiner

HYBRID ANTENNA DISTRIBUTION UNIT

The present application claims priority to U.S. provisional Application No. 62/905,898, filed Sep. 25, 2019, which is incorporated herein by reference in its entirety.

BACKGROUND

Cellular tower sites are increasingly distributed around the world to provide mobile communications for a variety of devices. Such sites typically include a radio unit connected to an antenna using radio frequency (RF) cabling, where the radio unit is supplied power by an input power cable (e.g., at −48 volts DC) and a return cable back to a power supply located in a shelter. Additionally, data is communicated between one or more base station units (also located in the shelter) and the radio unit over fiber optic cabling.

The cellular site also performs various processing to, for example, determine the appropriate frequency band for a transmission, amplify a signal, transmit and receive signals, etc. In older networks, this type of processing was typically done at the base inside the shelter, but after the introduction of third-generation (3G) and fourth-generation (4G) networks, at least some such processing (e.g., analog/digital conversion) has largely been moved from the base station unit in the shelter to a processing unit located near the top of the cellular tower, since a considerable amount of energy would otherwise be lost via the radio frequency (RF) cable connection between the base station unit and the antenna(s) at the top of the tower.

However, while performing processing at the top of the tower near the antenna helps to minimize energy loss, additional power and fiber optic cabling is required to supply power and data from the shelter to the unit on the tower. Conventional processing units are thus susceptible to damage and disruption from overvoltage and surge current when a lightning strike hits the tower (or nearby). Additionally, towers may host a number of different radio/antenna combinations, thus providing an issue for routing multiple DC link cables to fit the radios, and protecting the connections from overvoltage.

In some cases, hybrid cables are used in cellular sites to combine both fiber and power conductors. Inside such hybrid cables, there are copper wires that feed several radios with power, along with fiber optic cabling to provide a data connection to the radios. Typically, the hybrid cable is terminated in an enclosure and individual surge protectors are provided for each of the DC circuits that feed the radio. The fibers from the fiber optic cabling are terminated inside the enclosure and fiber jumpers are used to connect them to the radios. Likewise, power jumpers are used to connect the power wiring to each radio to the enclosure. An example of a cable breakout assembly is described in U.S. Pat. No. 9,575,277, the entire disclosure of which is incorporated by reference herein in its entirety.

One significant issue arising in conventional cellular sites is that the space available for the fiber optic breakout assembly (and other components) is extremely limited on the cellular tower, and this space is often costly for cellular operators to rent from owners of the tower. Embodiments of the present disclosure address this issue (among others) by providing a hybrid distribution unit that can distribute both power and data connections from a power and fiber cables (or from a hybrid cable containing both power and fiber) within a compact enclosure that helps reduce the overall footprint of the hybrid distribution unit mounted on a cellular tower.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

The disclosed embodiments relate to methods and systems for a hybrid distribution unit. The following description is presented to enable one of ordinary skill in the art to make and use the invention and is provided in the context of a patent application and its requirements. Various modifications to the exemplary embodiments and the generic principles and features described herein will be readily apparent. The disclosed embodiments are mainly described in terms of particular methods and systems provided in particular implementations. However, the methods and systems will operate effectively in other implementations. Phrases such as "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The disclosed embodiments will also be described in the context of particular methods having certain steps. However, the method and system operate effectively for other methods having different and/or additional steps and steps in different orders that are not inconsistent with the exemplary embodiments. Thus, the disclosed embodiments are not intended to be limited to the embodiments shown, but is to be accorded the widest scope consistent with the principles and features described herein.

Figure 1:
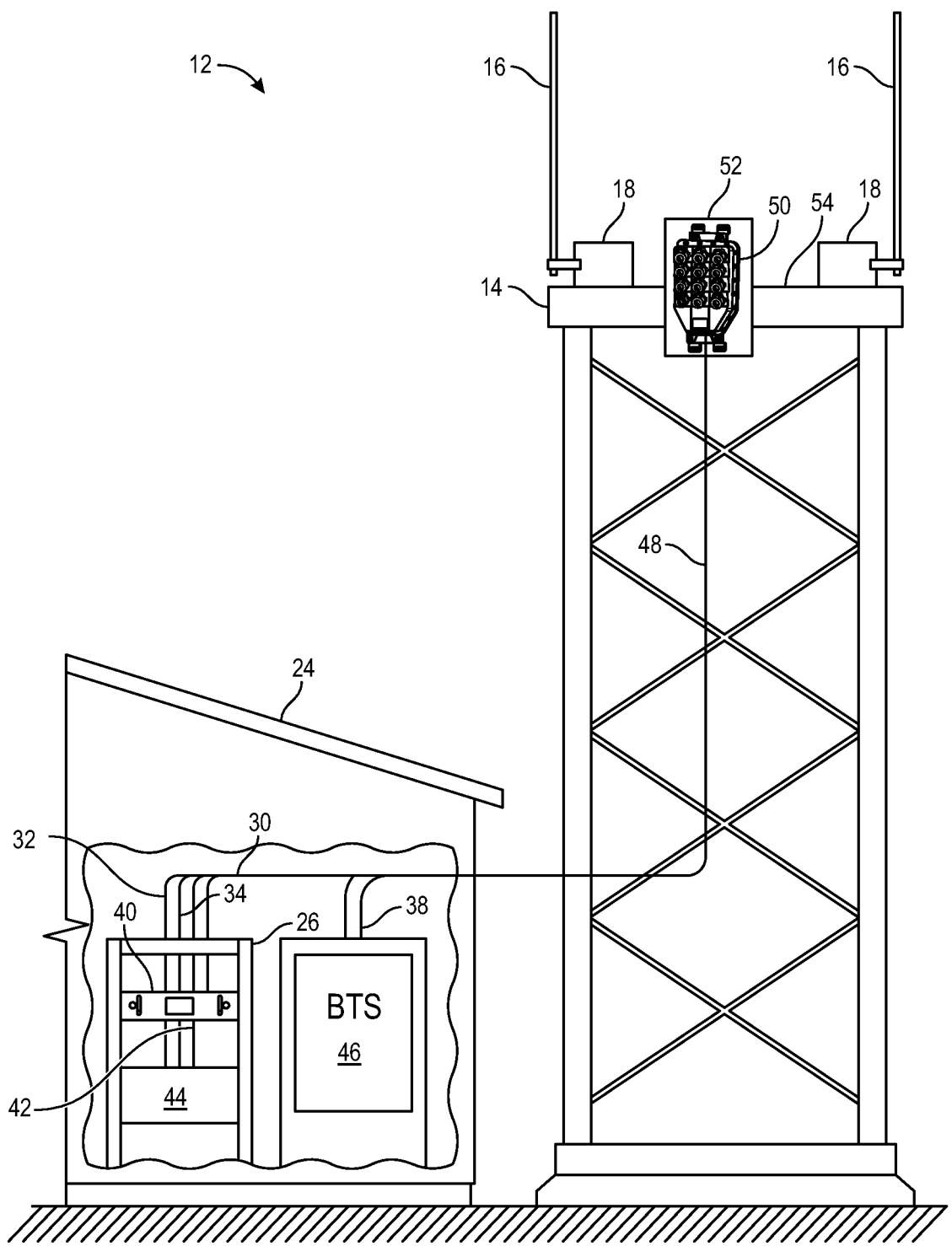
FIG. 1 illustrates an example of a power and communication system in accordance with various embodiments of the disclosure.

FIG. 1 illustrates one example of a power and communication system 12 that provides suppression for a distributed wireless communication station. A building 24 contains computing equipment for a base transceiver communication station (BTS) 46, which may also be referred to herein as a "baseband unit." Communication station 46 is connected through fiber optic cables 38 to different radios 18 (also referred to herein as "remote radio units") located on the top of a tower 14. A Direct Current (DC) power plant 44 is connected through DC power cables 30 to the different radios 18 on tower 14. The power plant 44 may also be referred to herein as a "power supply unit." In one example, DC power cables 30 include sets of −48 DC volt power cables 32, return power cables 34, and associated ground cables. In one example, power cables 30 and fiber optic cables 38 are run through a same hybrid trunk cable 48 that is routed out of building 24 and up tower 14 to a hybrid antenna distribution unit 50 of the disclosed embodiments.

A local base suppression unit 40 may be located inside of building 24 and connected to the local ends of power cables 30 relatively close to DC power plant 44 and communication station 46. In one embodiment, base suppression unit 40 is located in a rack 26 that also contains DC power plant 44. In another example, base suppression unit 40 is located in another rack or some other location next to power plant 44. Examples of base suppression units are described in U.S. Pat. No. 10,181,717 which is incorporated by reference in its entirety.

Hybrid antenna distribution unit (also referred to herein as a "hybrid distribution unit") 50 is attached to a support 52 on top of tower 14 and is connected to the remote ends of power cables 30 and fiber optic cables 38 proximate to radios 18 and antennas 16. In one example, distribution unit 50 is located within 2 meters of radios 18. Radios 18 may be connected to their respective antennas 16 via short RF cables.

The hybrid distribution unit may also be referred to herein as a hybrid fiber to the antenna (FTTA)/power to the antenna (PTTA) distribution unit. As illustrated in FIG. 1, the hybrid distribution unit 50 may be installed on a mobile communications tower or mast (such as tower 14) to provide for the connection and distribution of the hybrid trunk cable 48 to the jumpers 54 coupled to the remote radio units 18. As described in more detail, below, the hybrid distribution unit 50 also provides integrated over voltage protection (OVP) modules to help protect the remote radio units 18 (also referred to herein as "RRUs").

Among other things, hybrid FTTA/PTTA distribution units of the present disclosure help provide higher installation capacity compared to conventional distribution units, as the hybrid distribution units of the present disclosure can support a high number of RRUs in a small footprint. Furthermore, the hybrid distribution units of the present disclosure help simplify deployment and accelerate installations as they can be provided pre-terminated (e.g., no cable connections required in the field).

Figure 2A:
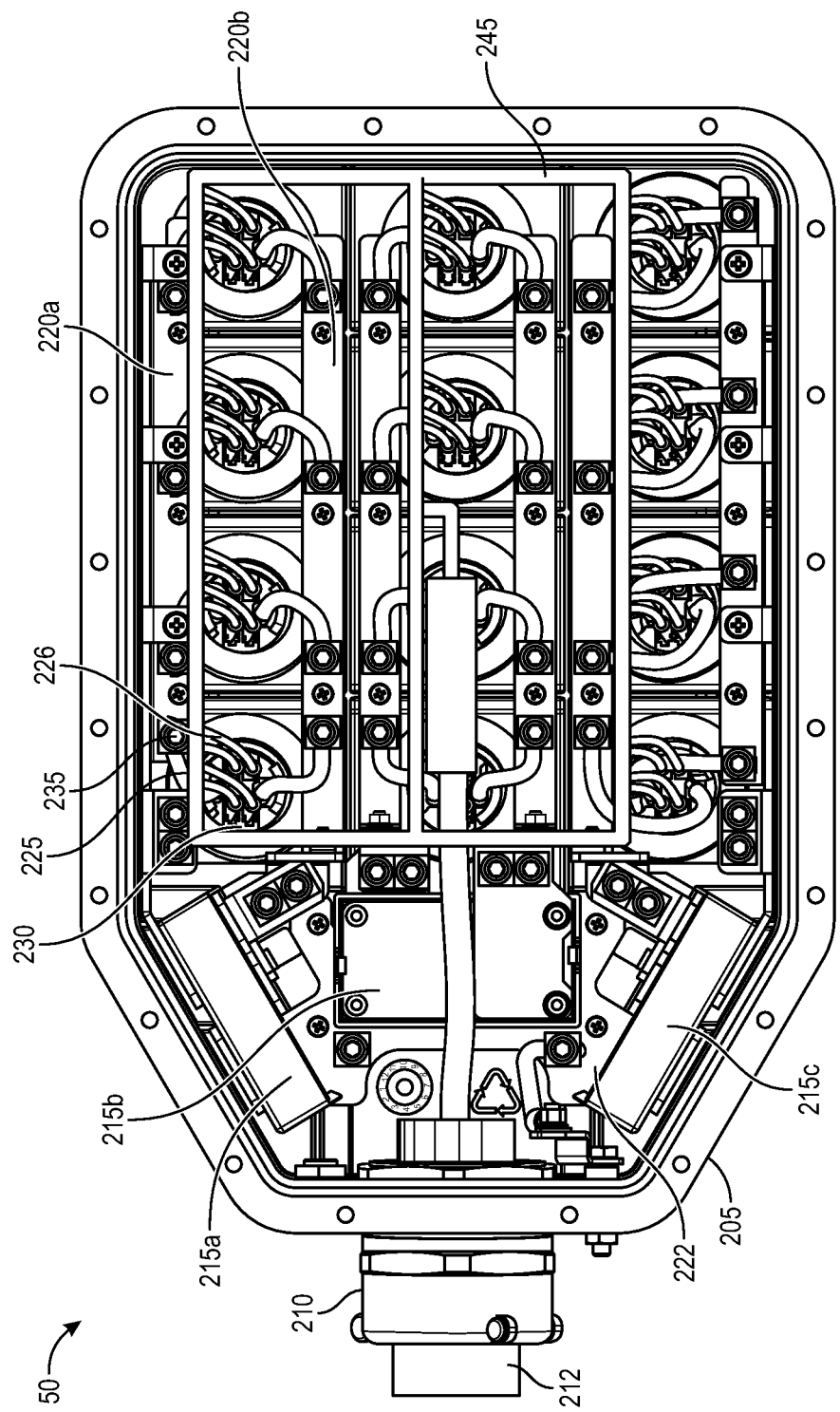
FIGS. 2A, 2B, and 2C illustrate examples of interior views of a hybrid antenna distribution unit in accordance with some embodiments.

FIG. 2A illustrates an interior view of a hybrid antenna distribution unit 50 in accordance with some embodiments. In this example, hybrid distribution unit 50 includes an enclosure 205 having an interior portion as shown. A cable entry and clamping mechanism 210 is disposed at the bottom of the enclosure 205 and is configured to receive a hybrid trunk cable 212 that includes one or more sets of power cables and one or more fiber optic cables. In alternate embodiments, the cable entry and clamping mechanism may be configured to receive separate power and data cables, such as a first trunk cable that includes one or more sets of power cables and a second trunk cable that includes one or more fiber optic cables.

Among other things, the enclosure 205 allows both the factory and field installation of the trunk cable(s) to the hybrid distribution unit 50. For example, in some cases the hybrid distribution unit may be pre-wired and terminated during factory assembly such that an installer is not required to make any cable connections in the field. Additionally or alternatively, a user may remove the external dust cover of the hybrid distribution unit 50 (described in more detail below) to access the internal portion of the enclosure to add or modify wiring connections.

The enclosure may be sized and dimensioned to effectively route power and data cabling while only requiring a minimal footprint on the cellular tower. As shown in FIG. 2A, for example, the enclosure is tapered at the bottom such that the width of the top of the enclosure is wider than the width of the bottom. This helps to conserve space while still providing an efficient and effective routing of the cabling that can easily be accessed by installers or maintenance personnel.

The enclosure 205 may house one or more overvoltage protection (OVP) modules. In the example shown in FIG. 2A, OVP modules 215a, 215b, and 215c are disposed at the bottom of the interior portion of the enclosure, with OVP module 215a coupled to a first elongated bus bar 220a extending along a portion of the length of enclosure 205 (along the left side of the enclosure) and a second elongated bus bar 220b extending along a portion of the length of enclosure 205 parallel to the first bus bar 220a. In this example, the first bus bar 220a is an input power bus bar (−48V in this example) and the second bus bar 220b is a return power bus bar. In FIG. 2A, a ground plate 222 is disposed in the bottom of the enclosure 205 and is configured to extend and connect (e.g., through ground wiring) to the OVP modules 215a, 215b, and 215c.

Figure 2B:
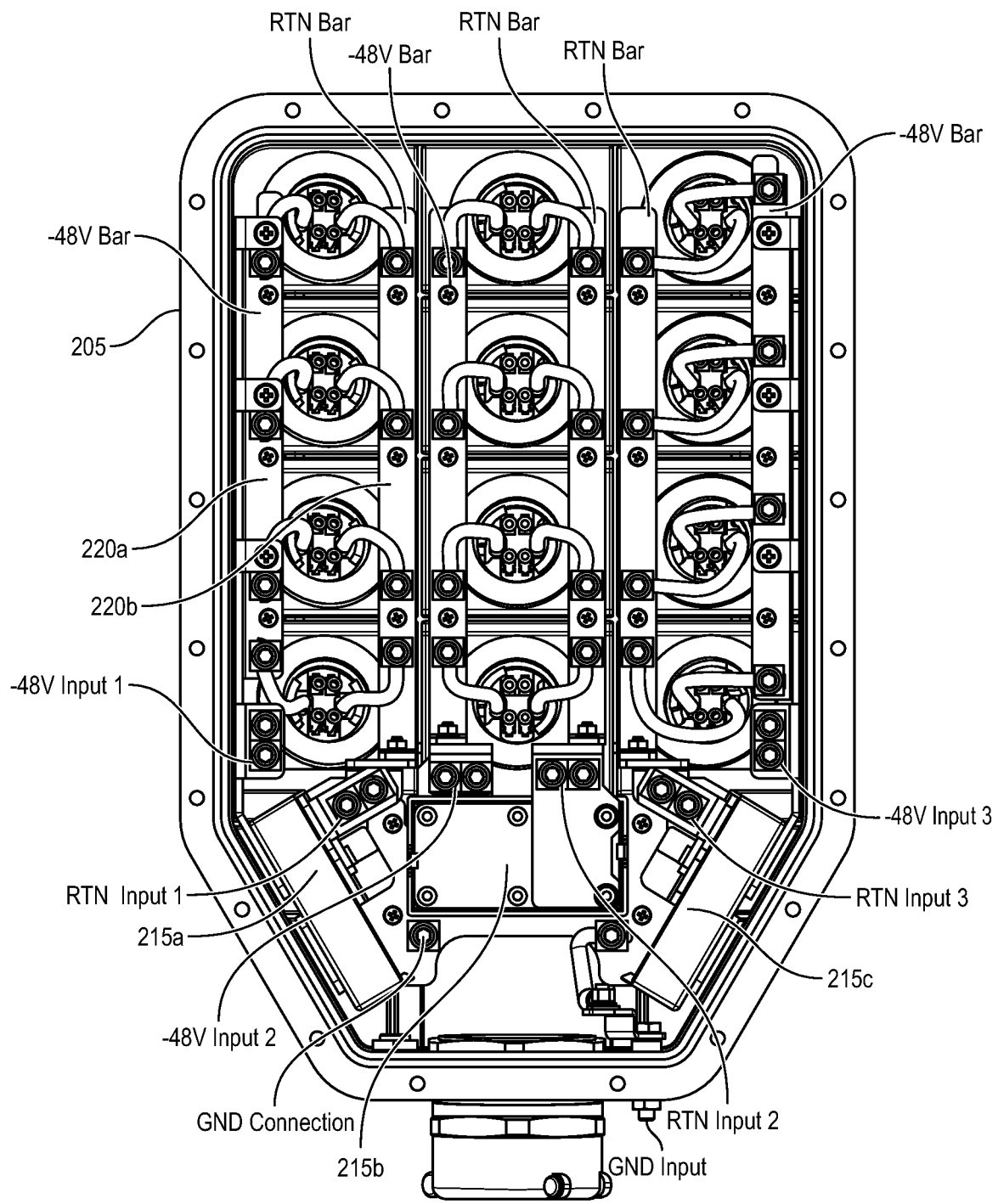

FIG. 2B provides a more detailed view of the power connections within the enclosure 205. In this example, there are three pairs of elongated bus bars (a −48V bar and corresponding return "RTN" bar) running lengthwise within the enclosure, though in alternate embodiments there may be more or fewer sets of bus bars.

As illustrated in FIG. 2B, the power conductors of the hybrid (or power) trunk cable are connected to the terminals of the OVP modules 215a, 215b, and 215c at the bottom of the housing. To optimize the cable routing and minimize the assembly and installation time, two bars, −48V and RTN, equipped with lugs are connected to each OVP module and run lengthwise along the housing. For example, OVP 215a is connected to bars 220a and 220b.

As shown in FIG. 2A, short factory terminated power cables are used for the connection of the bars' lugs to the proper terminals of the hybrid (or power) adaptors. For example, short power cable 225 connects the input power connection from adaptor 230 to the lug 235 on the first bus bar 220a.

Figure 2C:
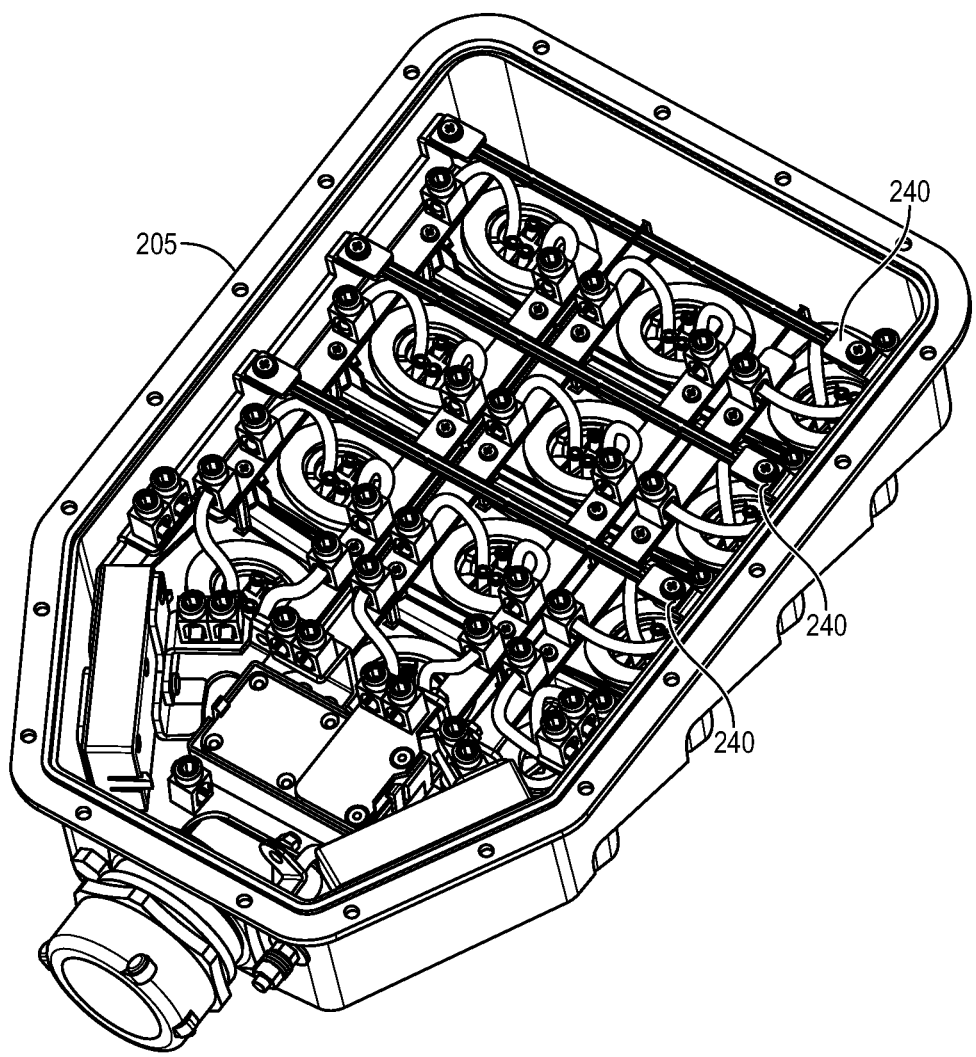

The fiber optic portion of the hybrid cable (or the fiber optic cable in case of separate power and fiber optic trunk cables) is routed above the OVP modules through the interior portion of the enclosure 205. FIG. 2C illustrates the enclosure 205 with the addition of fiber optic cable support elements 240 coupled to opposite sides of the enclosure. The fiber optic cable support elements 240 are configured to retain one or more fiber optic cables using one or more fasteners. In this example, three fiber optic cable support elements 240 are depicted running across the width of the enclosure, but in alternate embodiments more or fewer support elements may be used, and the elements may run in any suitable configuration (e.g., lengthwise) in the enclosure.

Figure 2D:
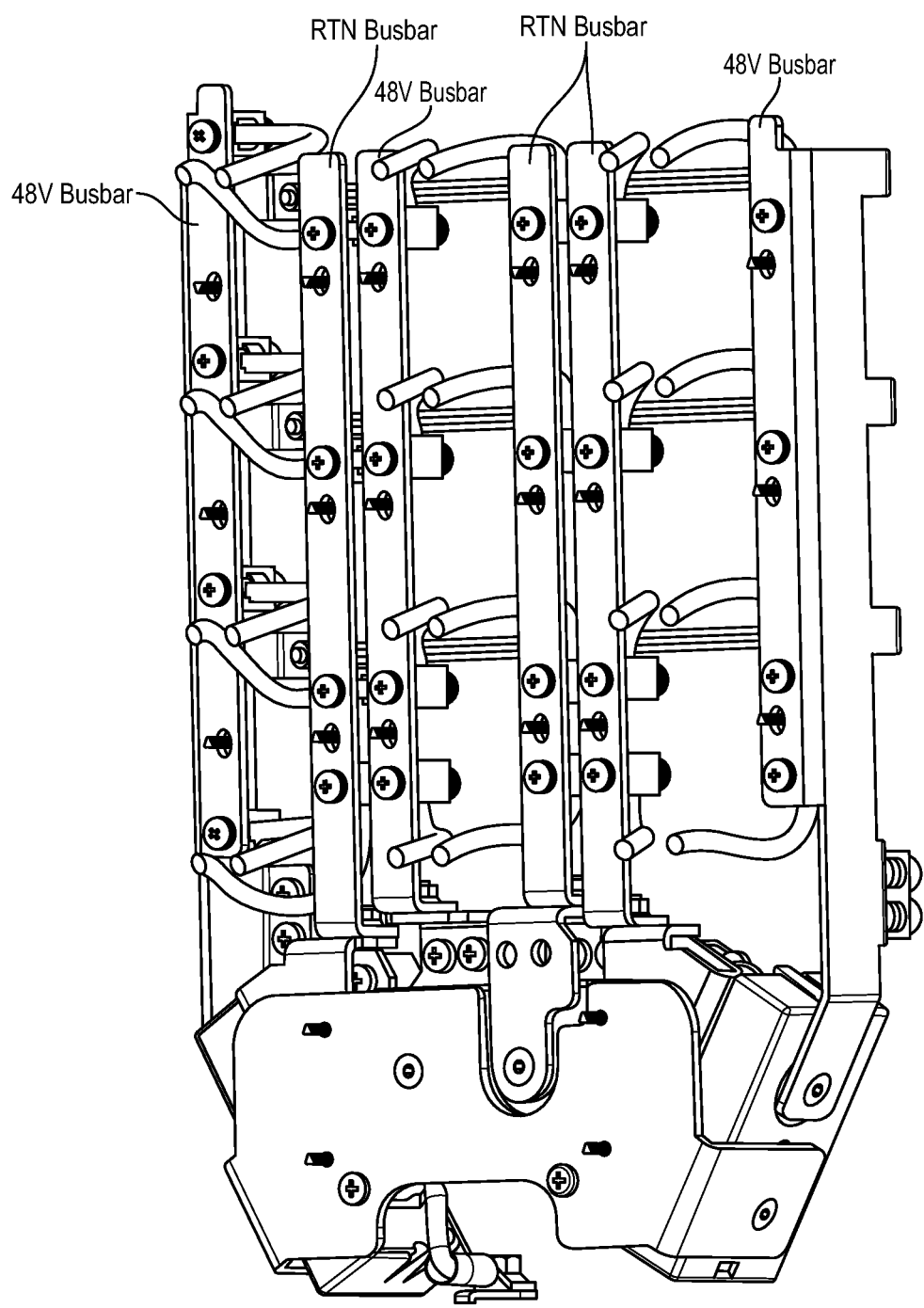
FIGS. 2D, 2E, and 2F are cut-away views of the hybrid antenna distribution unit shown in FIGS. 2A-2C.
Figure 2E:
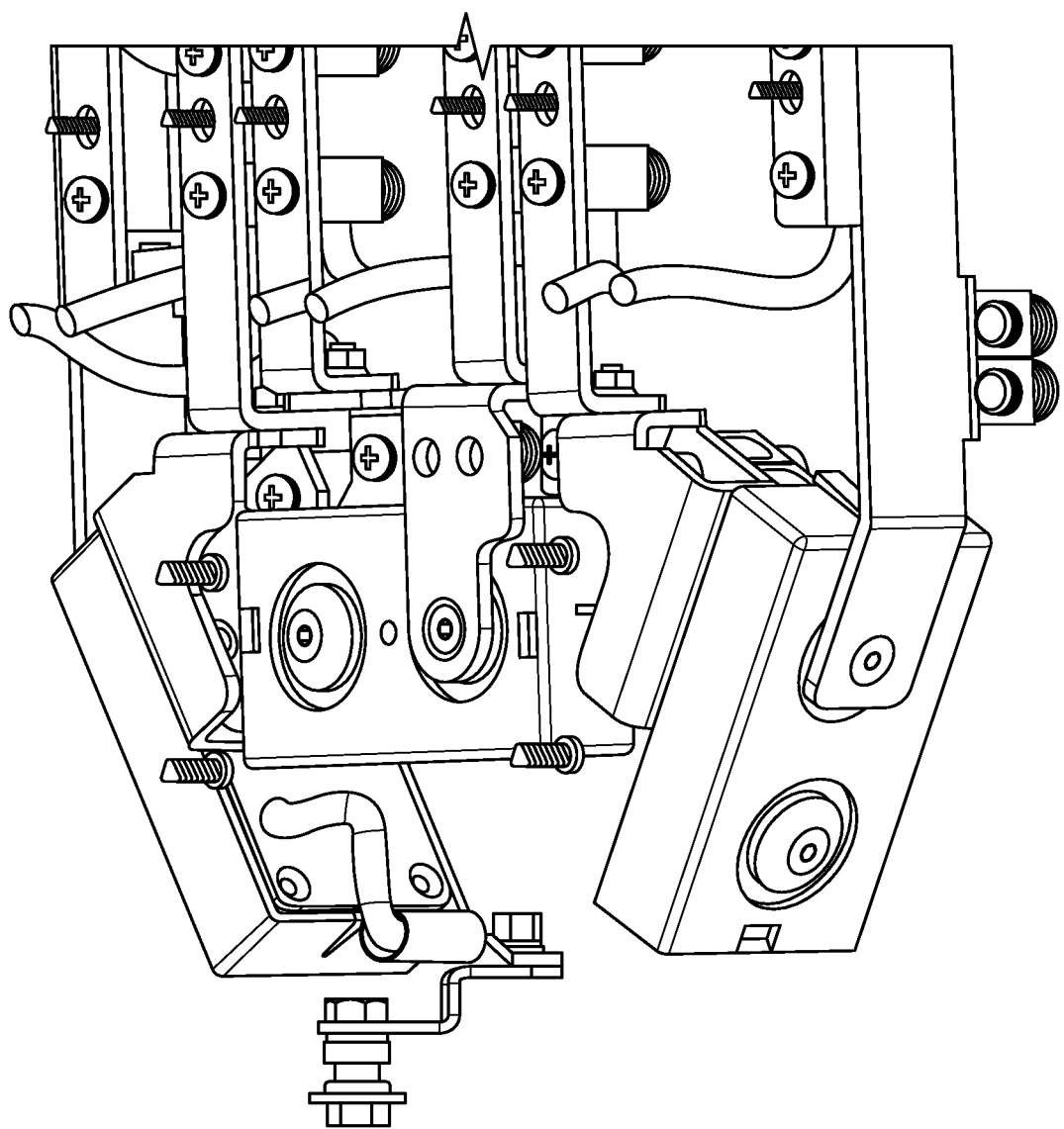
Figure 2F:
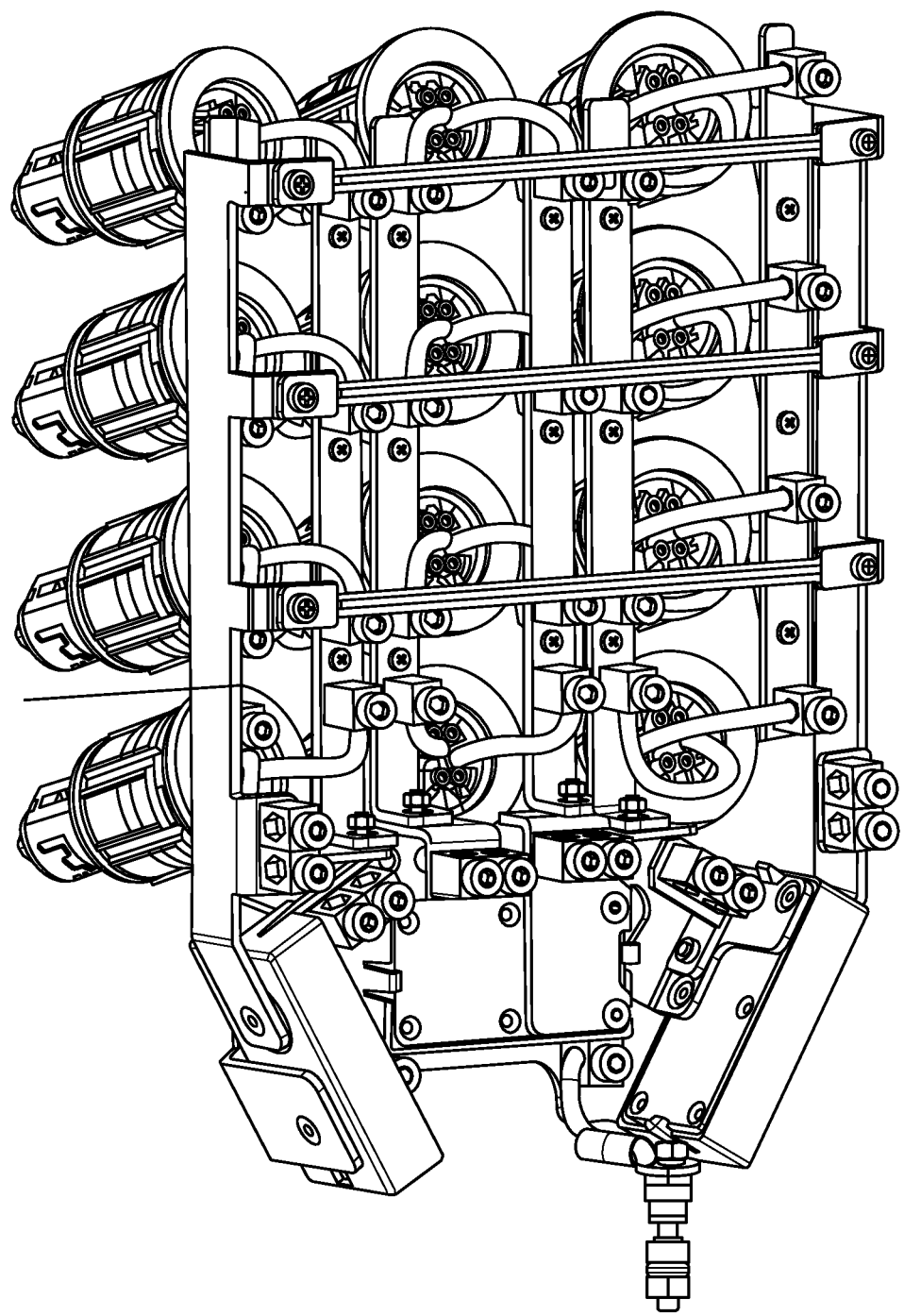

The fiber optic cable support elements 240 allow portions of the fiber optic cables 245 to be fastened to the support elements 240 using, for example, hook-and-loop fasteners coupled to the support elements 240. Additionally, the support elements 240 may be disposed between the fiber optic cabling 245 and the removably attachable dust cover (discussed below) to help protect the fiber optic cable against crimping or other damage during the assembly of the housing. FIGS. 2D, 2E, and 2F are exploded views of the hybrid antenna distribution unit shown in FIGS. 2A-2C.

Figure 3A:
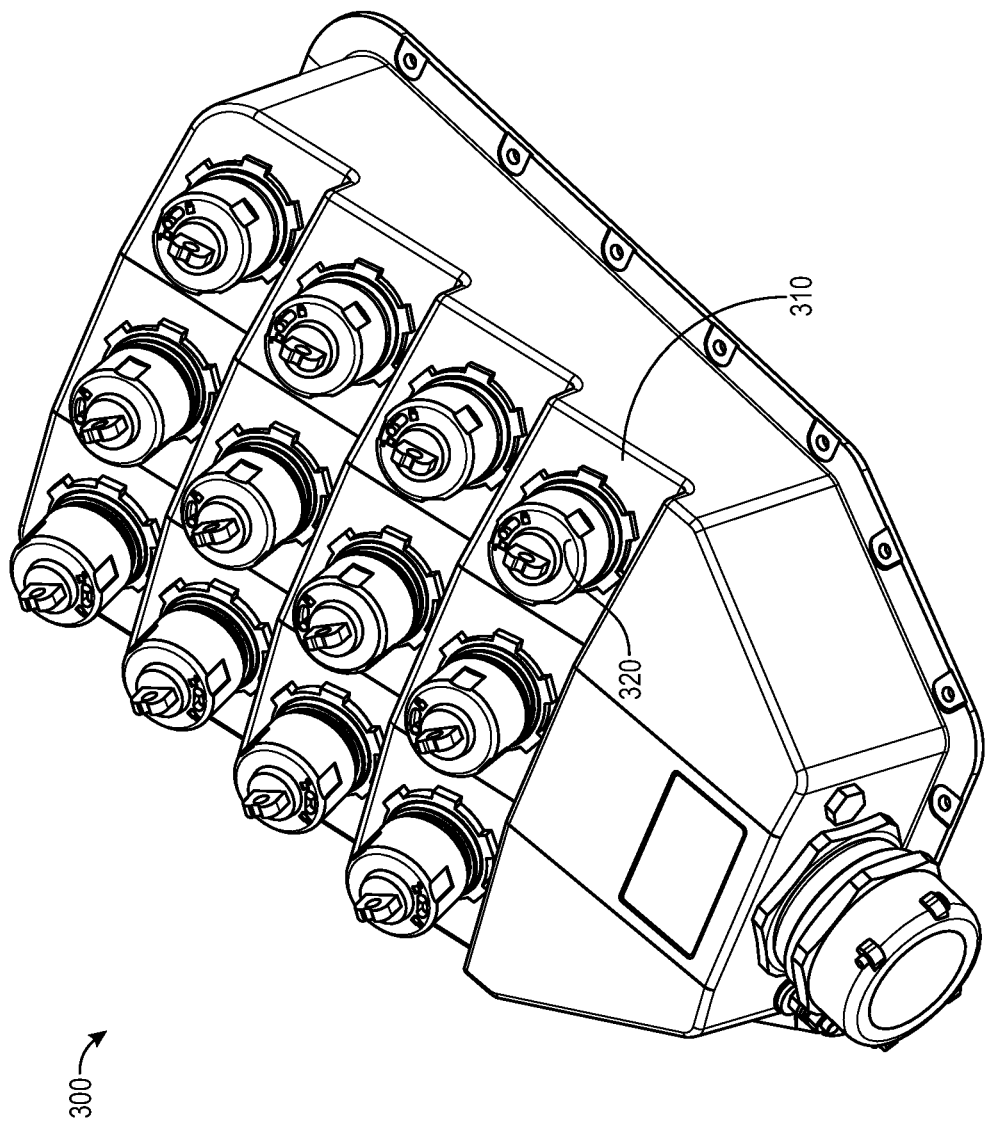
FIGS. 3A and 3B illustrate an example of the exterior portion of a hybrid distribution unit in accordance with various embodiments of the disclosure.
Figure 3B:
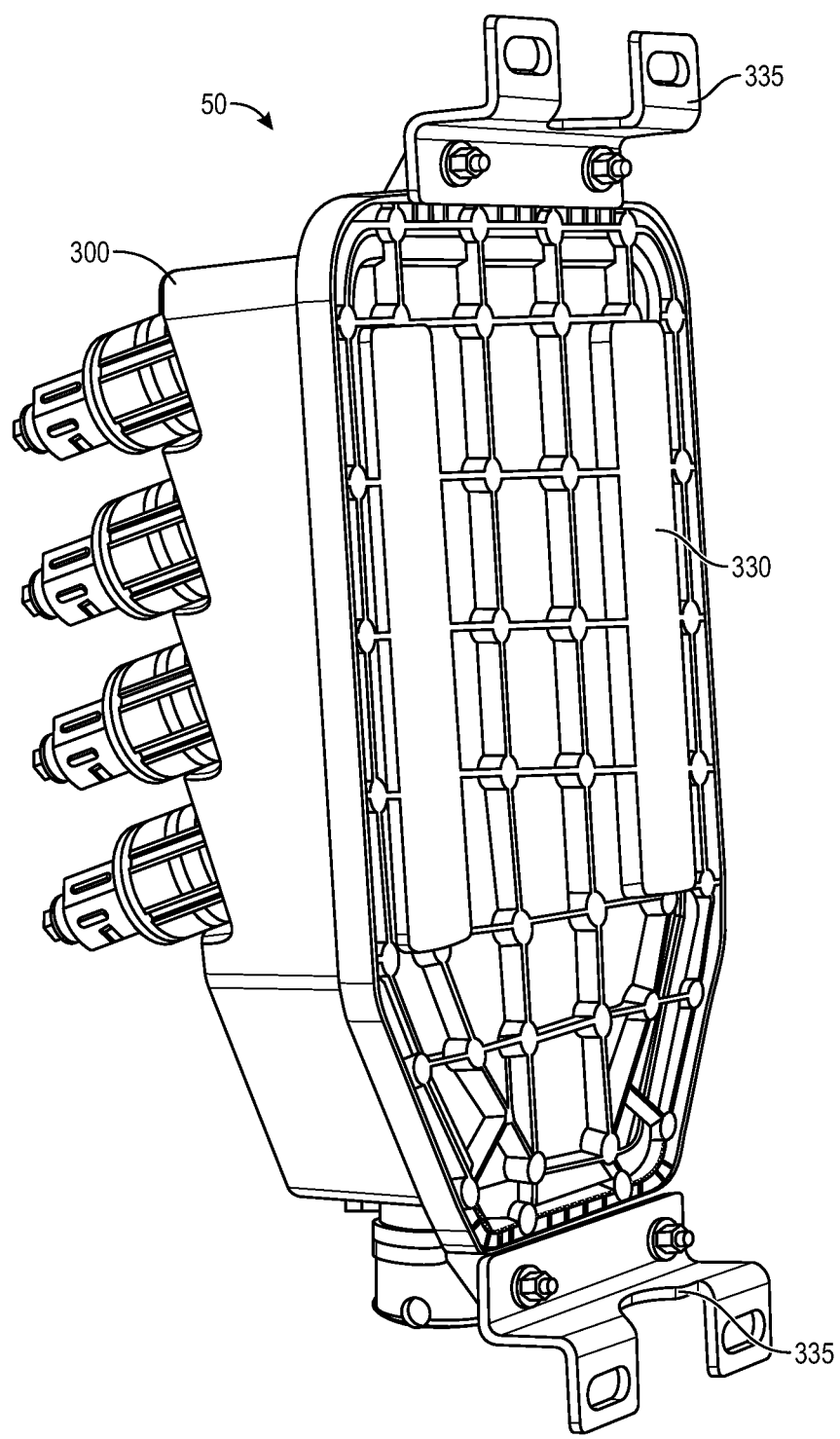

FIGS. 3A and 3B illustrate an example of the exterior portion 300 of hybrid distribution unit 50. In this example, portion 300 may be coupled (e.g., using screws or nuts and bolts around the perimeter of portion 300) to a dust cover 330 that encloses and protects the interior portion of the enclosure 205. The dust cover 330 may also include (or be coupled to) support brackets 335 that allows the hybrid distribution unit 50 to be mounted on the cellular tower 14. FIG. 3E illustrates a cut-away view of the exterior portion of the hybrid distribution unit shown in FIGS. 3A and 3B.

As shown in FIG. 3A, the exterior portion 300 includes a plurality of angled tiered platforms 310, with each platform configured to retain a row of adapters 320. In this example, four angled platforms are shown, each with three adaptors per platform, but alternate embodiments may include more or fewer platforms, and more or fewer adaptors per platform. In this example, the plurality of angled tiered platforms 310 are angled toward the bottom of the enclosure. Among other things, this assists an installer (usually standing below the hybrid distribution unit 50 on a ladder or other support) to connect or disconnect cabling to the adaptors 320.

Figure 3C:
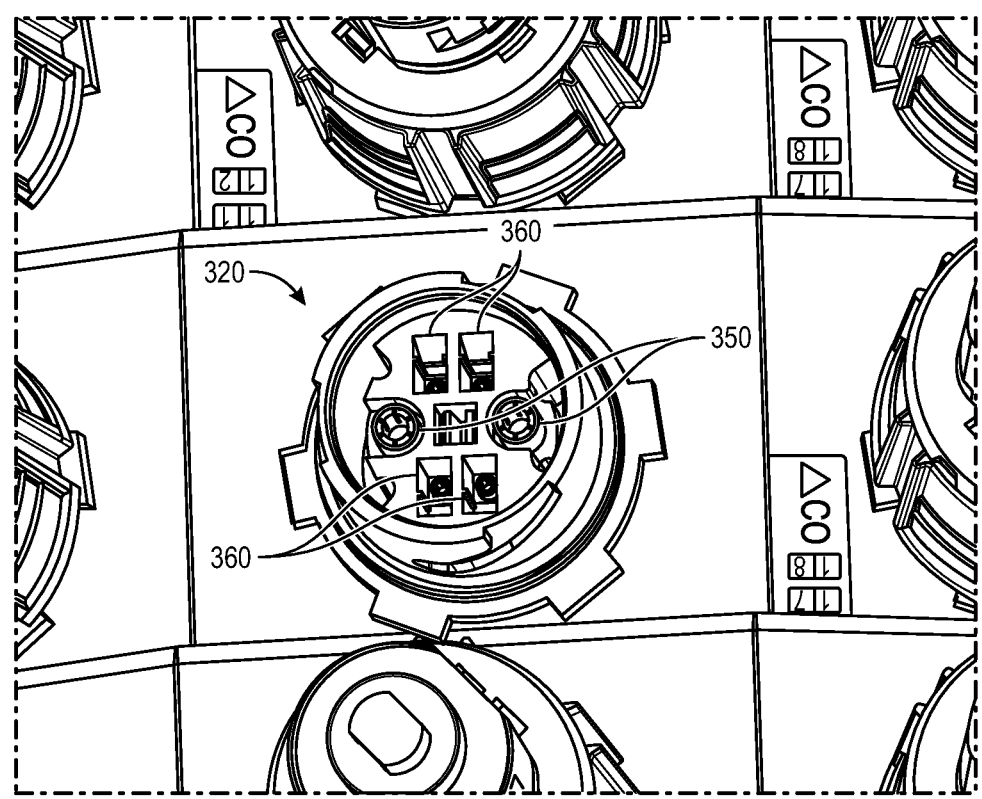
FIG. 3C illustrates an example of a hybrid adaptor in accordance with various embodiments of the disclosure.
Figure 3D:
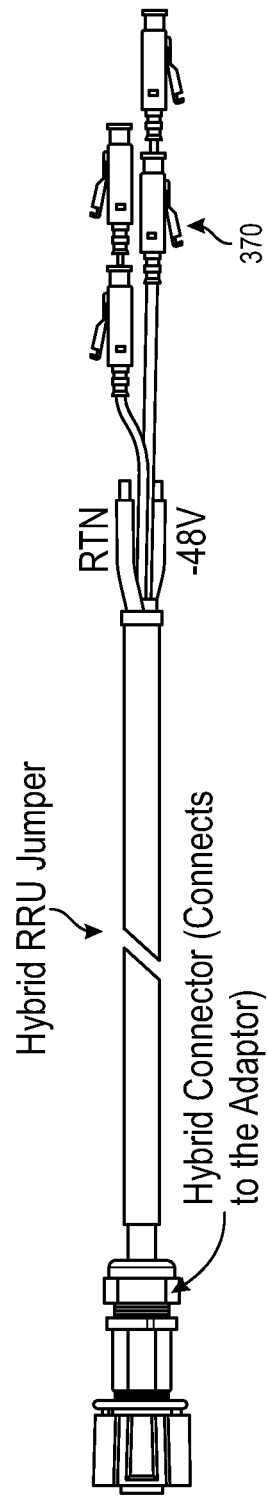
FIG. 3D illustrates an example of a hybrid cable that may be used to connect to the adaptor depicted in FIG. 3C.
Figure 3E:
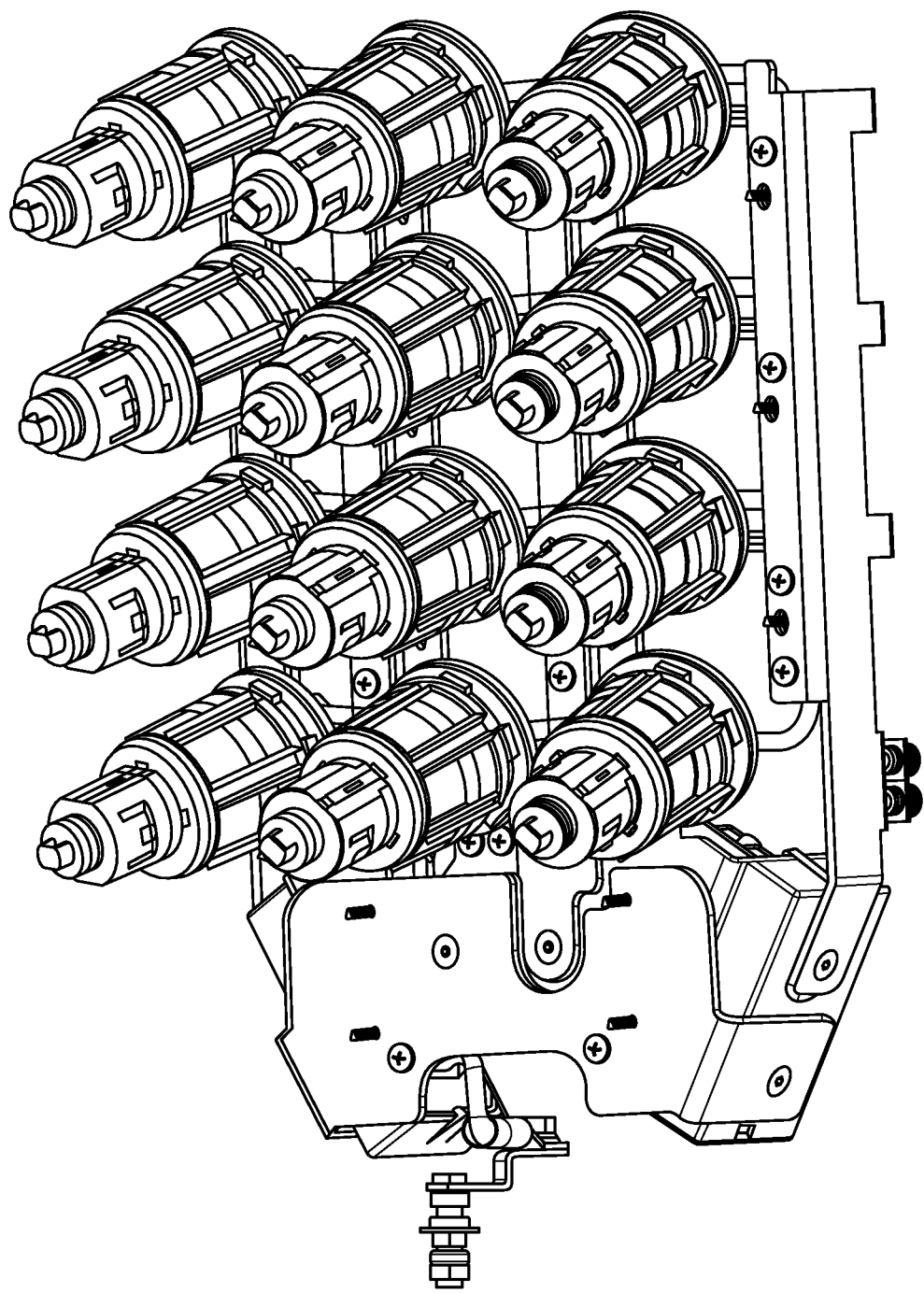
FIG. 3E illustrates a cut-away view of the exterior portion of the hybrid distribution unit shown in FIGS. 3A and 3B.

FIG. 3C illustrates a detailed view of the terminals of a hybrid adaptor 320 that may be used in conjunction with embodiments of the present disclosure. In alternate embodiments, hybrid distribution units of the present disclosure may operate in conjunction with adaptors of any suitable size, shape, and configuration. In the example depicted in FIG. 3C, adaptor 320 includes a pair of power terminals 350, corresponding to an input power terminal and return power terminal as discussed above. The adaptor 320 further includes fiber optic connectors 360. The power terminals 350 and fiber optic terminals 360 connect to the power cables and fiber optic cables, respectively, as shown in the interior view of the hybrid distribution unit 50 in FIG. 2A. For example, power jumper cables (e.g., power jumper cable 225) and fiber optic jumper cables (e.g., fiber optic jumper cable 226) plug into the ends of power terminals 350 and fiber optic terminals 360, respectively. FIG. 3D illustrates an example of a hybrid cable that may be used to connect to the adaptors 320. In this example, the hybrid RRU jumper cable includes supply power (−48) and return (RTN) power lines, along with fiber optic connectors 360. There are two pairs of fiber optic connectors 360 in this example, one pair for the top set of connectors 360 and one for the pair for the bottom set of connectors 360 shown in FIG. 3C.

Figure 4:
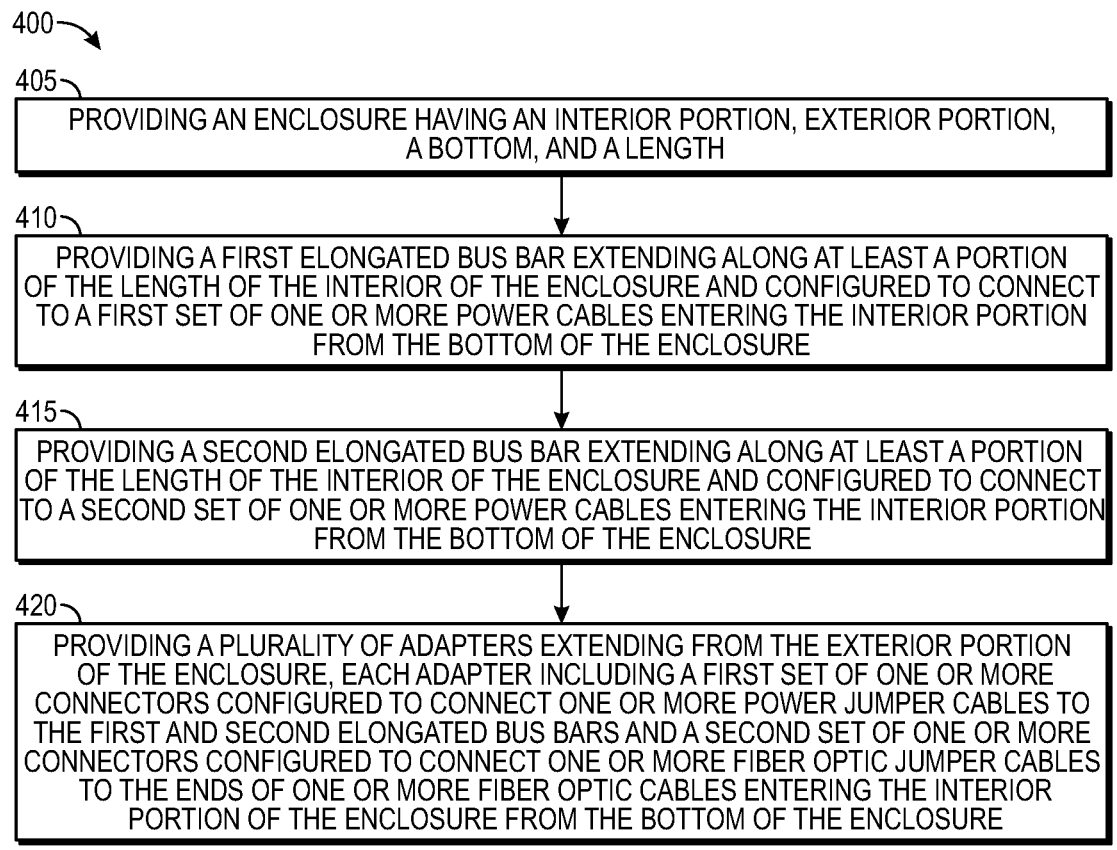
FIG. 4 illustrates an example of a process for manufacturing a hybrid distribution unit in accordance with various embodiments of the disclosure.

FIG. 4 illustrates an example of a process for manufacturing a hybrid distribution unit according to various embodiments. The hybrid distribution units of the present disclosure provide a number of advantages over conventional systems. For example, embodiments of the disclosure help provide both overvoltage protection and fiber/power cabling distribution in a small footprint housing. The mechanical design and the use of bars in the interior of the housing allow the reduction of the required volume for the connection of the cables. The hybrid distribution units of the present disclosure provide space for the safe routing of the fiber optic cables, taking into consideration the minimum bend radius requirements, while also protecting the fiber cabling from damage and doing so with a minimal footprint. Additionally, the hybrid distribution units of this disclosure can either factory terminated or installed in the field, and can be configured to be compatible with a variety of hybrid trunk cabling or stand-alone power/fiber cabling.

The figures listed above illustrate examples of embodiments of the application and the operation of such examples. In the figures, the size of the boxes is not intended to represent the size of the various physical components. Where the same element appears in multiple figures, the same reference numeral is used to denote the element in all of the figures where it appears.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A hybrid distribution unit apparatus comprising:
   an enclosure having an interior portion, exterior portion, a bottom, and a length;
   a first elongated bus bar extending along at least a portion of the length of the interior portion of the enclosure and configured to connect to a first set of one or more power cables entering the interior portion from the bottom of the enclosure;
   a second elongated bus bar extending along at least a portion of the length of the interior of the enclosure and configured to connect to a second set of one or more power cables entering the interior portion from the bottom of the enclosure;
   a plurality of adapters extending from the exterior portion of the enclosure, each adapter including a first set of one or more connectors configured to connect one or more power jumper cables to the first and second elongated bus bars and a second set of one or more connectors configured to connect one or more fiber optic jumper cables to the ends of one or more fiber optic cables entering the interior portion of the enclosure from the bottom of the enclosure; and
   one or more fiber optic cable support elements coupled to the enclosure and configured to retain the one or more fiber optic cables using one or more fasteners, wherein the one of the fiber optic cable support elements are disposed between the one or more fiber optic cables and a dust cover that is removably attachable to the hybrid distribution unit apparatus.

2. The hybrid distribution unit apparatus of claim 1, wherein the exterior portion of the enclosure includes a plurality of angled tiered platforms, each of the plurality of angled tiered platforms configured to retain a row of the adapters.

3. The hybrid distribution unit apparatus of claim 2, wherein the plurality of angled tiered platforms are angled toward the bottom of the enclosure.

4. The hybrid distribution unit apparatus of claim 2, wherein the dust cover that is removably attachable to the hybrid distribution unit apparatus is to enclose the interior portion of the enclosure.

5. The hybrid distribution unit apparatus of claim 1, wherein the enclosure includes a top, and wherein a width of the top of the enclosure is greater than a width of the bottom of the enclosure.

6. The hybrid distribution unit apparatus of claim 1, wherein the first elongated bus bar is an input power bus bar and the second elongated bus bar is a return power bus bar.

7. The hybrid distribution unit apparatus of claim 6, wherein the input power bus bar is a −48V bus bar.

8. The hybrid distribution unit apparatus of claim 6, wherein the first set of one or more connectors for each respective adaptor includes:
 a respective first power conductor coupled to a respective first lug on the first elongated bus bar; and
 a respective second power conductor coupled to a respective second lug on the second elongated bus bar.

9. The hybrid distribution unit apparatus of claim 1, further comprising one or more overvoltage protection (OVP) modules disposed within the interior portion of the enclosure and coupled to one or more of the first elongated bus bar and the second elongated bus bar.

10. The hybrid distribution unit apparatus of claim 9, wherein the one or more OVP modules are disposed at the bottom of the interior of the enclosure.

11. The hybrid distribution unit apparatus of claim 9, further comprising a ground plate configured to extend and connect to each of the one or more OVP modules.

12. The hybrid distribution unit apparatus of claim 1, wherein the one or more fasteners include a hook-and-loop fastener coupled to one of the fiber optic cable support elements.

13. The hybrid distribution unit apparatus of claim 1, further comprising a cable entry and clamping mechanism disposed at the bottom of the enclosure.

14. The hybrid distribution unit apparatus of claim 13, wherein the cable entry and clamping mechanism is configured to receive a hybrid trunk cable that includes the first set of one or more power cables, the second set of one or more power cables, and the one or more fiber optic cables.

15. The hybrid distribution unit apparatus of claim 13, wherein the cable entry and clamping mechanism is configured to receive a first trunk cable that includes the first set of one or more power cables and the second set of one or more power cables, and a second trunk cable that includes the one or more fiber optic cables.

16. The hybrid distribution unit apparatus of claim 1, wherein the one or more power jumper cables are removably connectable to the first elongated bus bar and the second elongated bus bar, and the one or more fiber optic jumper cables are removably connectable to the ends of the one or more fiber optic cables.

17. A mobile communication tower system comprising:
 a tower; and
 a hybrid distribution unit apparatus coupled to the tower and including:
  an enclosure having an interior portion, exterior portion, a bottom, and a length;
  a first elongated bus bar extending along at least a portion of the length of the interior of the enclosure and configured to connect to a first set of one or more power cables entering the interior portion from the bottom of the enclosure from a power supply unit;
  a second elongated bus bar extending along at least a portion of the length of the interior of the enclosure and configured to connect to a second set of one or more power cables entering the interior portion from the bottom of the enclosure from the power supply unit;
  a plurality of adapters extending from the exterior portion of the enclosure, each adapter including a first set of one or more connectors configured to connect one or more power jumper cables to the first and second elongated bus bars and a second set of one or more connectors configured to connect one or more fiber optic jumper cables to the ends of one or more fiber optic cables entering the interior portion of the enclosure from the bottom of the enclosure from a baseband unit; and
  one or more fiber optic cable support elements coupled to the enclosure and configured to retain the one or more fiber optic cables using one or more fasteners, wherein the one of the fiber optic cable support elements are disposed between the one or more fiber optic cables and a dust cover that is removably attachable to the hybrid distribution unit apparatus.

18. A method of manufacturing a hybrid distribution unit apparatus, the method comprising:
 providing an enclosure having an interior portion, exterior portion, a bottom, and a length;
 providing a first elongated bus bar extending along at least a portion of the length of the interior of the enclosure and configured to connect to a first set of one or more power cables entering the interior portion from the bottom of the enclosure;
 providing a second elongated bus bar extending along at least a portion of the length of the interior of the enclosure and configured to connect to a second set of one or more power cables entering the interior portion from the bottom of the enclosure;
 providing a plurality of adapters extending from the exterior portion of the enclosure, each adapter including a first set of one or more connectors configured to connect one or more power jumper cables to the first and second elongated bus bars and a second set of one or more connectors configured to connect one or more fiber optic jumper cables to ends of one or more fiber optic cables entering the interior portion of the enclosure from the bottom of the enclosure; and
 providing one or more fiber optic cable support elements coupled to the enclosure and configured to retain the one or more fiber optic cables using one or more fasteners, wherein the one of the fiber optic cable support elements are disposed between the one or more fiber optic cables and a dust cover that is removably attachable to the hybrid distribution unit apparatus.

* * * * *